UNITED STATES PATENT OFFICE.

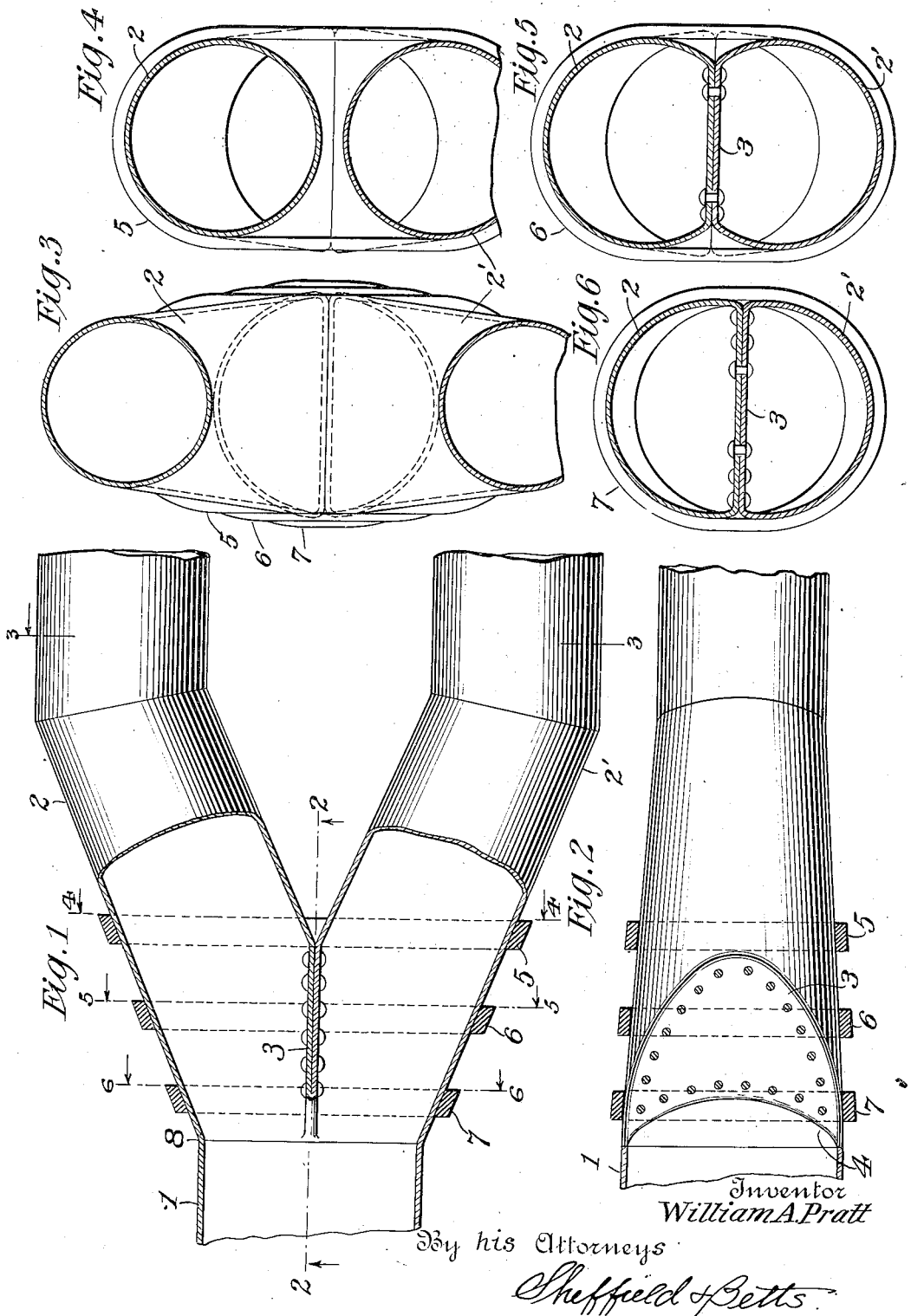

WILLIAM A. PRATT, OF BAYONNE, NEW JERSEY, ASSIGNOR TO THE M. W. KELLOGG CO., A CORPORATION OF DELAWARE.

HYDRAULIC-PIPE JOINT.

1,378,054. Specification of Letters Patent. Patented May 17, 1921.

Application filed March 27, 1920. Serial No. 369,245.

*To all whom it may concern:*

Be it known that I, WILLIAM A. PRATT, a citizen of the United States, residing at Bayonne, in the county of Hudson, State of New Jersey, have invented certain new and useful Improvements in Hydraulic - Pipe Joints, of which the following is a full, clear, concise, and exact description.

My invention relates to joints for pipes, particularly those employed in dividing the flow of water into branches leading to penstocks of hydraulic turbines, although it will be obvious from the following description that the use of my invention is not confined to such instances.

One of the main objects of my invention is to make it possible to fabricate such pipe joints, as are above referred to, from wrought or rolled sheet material or metal, such as steel plates, thereby eliminating the necessity of making heavy, complicated and cumbersome steel castings provided with additional strengthening bars, as has generally been necessary heretofore for the purpose mentioned. A further object of my invention is to provide a joint composed of cast, forged or plate material which shall have a minimum effect as regards friction, eddy currents and other objectionable features tending to retard the free flow of water therethrough. A further object of my invention is to enable such joints to be manufactured from sheet material or steel plates which are first made into tubular form and then wrought or bent into the shape required for producing the improved results hereinafter pointed out. By employing the means and methods herein set forth, a simple unitary hydraulic pipe joint for lateral branches is made possible, and one in which the cross-sectional area, taken at successive points from the main portion thereof to the cylindrical portion of the branches, is practically unchanged, thus reducing the retardation of the flow therethrough to a minimum, and at the same time giving increased strength and freedom from distortion.

For a detailed description of one form of my invention, which I at present deem preferable, reference may be had to the following specification and to the accompanying drawing forming a part thereof, in which Figure 1 is a plan view partially in section, disclosing the interior construction thereof. Fig. 2 is a longitudinal section taken substantially on the line 2—2, Fig. 1. Fig. 3 a cross section looking from right to left at 3—3, Fig. 1. Fig. 4 is a transverse sectional view taken substantially in the plane of the right hand edge of the first or largest reinforcing band of Fig. 1. Fig. 5 is a similar transverse sectional view taken at the second reinforcing band of Fig. 1, and Fig. 6 is a similar transverse sectional view taken at the third reinforcing band of Fig. 1.

Referring to the drawings, the numeral 1 indicates the larger or main portion of the pipe. The numerals 2 and 2' the respective branches or laterals diverging from each other and extending from the main portion 1. The lateral portions 2 and 2' in their primary shape are approximately cylindrical in cross section throughout their lengths, and when equal division of the flow is desired, the area of the circular end of each should be substantially equal to one-half of the area of the end of the main portion 1. After the smaller branch portions have been formed into their primary tubular shape and the seams welded or riveted, a portion of each is flattened on an inclined plane so that the edge thereof will correspond to a diameter of the main portion 1 and the outline of the flattened portions will assume approximately the shape of one-half of an ellipse formed by ends of the successive transverse chords thereof, as indicated at 3 in Fig. 2. These flattened portions are then brought together and secured in any suitable way, such as by riveting or welding. I prefer to introduce a certain number of rivets to hold said flattened portions in position, and also to weld the edges, which are first cut back in the manner indicated at 4 in Fig. 2. The portions 2 and 2' having thus been united, they are then attached to the end of the main portion 1 by riveting or welding as at 8, preferably by the latter method. It will now be observed that the flattened portions 3 form a longitudinal web having the effect of an internal tension member which prevents the internal pressure from distorting the joint in the direction of the minor axis of the approximate ellipse formed by the outline of the joint. It will now be apparent that should this diaphragm be alone relied upon to hold the parts in position against distortion, there would be a tendency, under high internal pressure, toward a resumption of the cylindrical form of the branches or laterals, tending to disrupt the joint between the flattened contracting surfaces of these portions. In order to obviate this I apply to the exterior of the joint a series of tension bands, as indicated at 5, 6 and 7. These bands are preferably made of steel and after being applied in their proper positions, are fixed by riveting, welding or other suitable holding devices. It will now be apparent that the inclosing bands 5, 6 and 7 are subjected only to the strain of tension, and owing to the fact that the central flat web 3 also acts as a tie or as an internal tension member, there will be no tendency toward unequal distortion of any parts subjected to pressure which would tend to make them assume cylindrical forms.

Having thus described this form of my invention, I do not wish to be understood as being limited to the details and arrangements of the parts set forth, for various changes may be made by those skilled in the art without departing from the spirit and scope of my invention.

What I claim and desire to protect by Letters Patent is:

1. A pipe joint of integral wrought sheet metal, comprising a main portion and branch portions, the latter having outer ends which are circular and whose inner ends are semi-circular, the intermediate portions of the branches merging progressively from the circular to the semi-circular form, the flattened chordal surfaces being united and the outer curved margins being connected with said main portion.

2. A pipe joint of integral wrought sheet metal, comprising a main portion and branch portions, the latter having outer ends which are circular and whose inner ends are semi-circular and being of substantially equal areas, the intermediate portions of the branches merging progressively from the circular to the semi-circular form, the flattened chordal surfaces being united and the curved edges being attached to said main portion.

3. A joint for lateral branch pipes, comprising a main portion and branch portions, the latter having flattened sides at their inner ends forming a longitudinal retaining web, and means for preventing distortion of said branch portions under internal pressure.

4. A joint for lateral branch pipes, comprising a main portion and branch portions, the latter having circular outer ends, the inner ends of the branch portions being flattened so as to bisect the angle between the respective axes of the branch portions, means for uniting the flattened surfaces thereby forming a longitudinal retaining member and means surrounding said branch portions for preventing distortion under internal pressure.

5. A joint for lateral branch pipes, comprising a main portion and reduced branch portions, the latter having circular outer ends and flattened surfaces at the inner ends, means for uniting the flattened surfaces, thereby forming a longitudinal retaining member, and means surrounding said branch portions for preventing distortion under internal pressure.

6. A joint for lateral branch pipes, comprising a main portion and reduced branch portions, the latter having circular outer ends and flattened surfaces at the inner ends, means for uniting said flattened surfaces, thereby forming a longitudinal retaining member, the combined transverse areas of said inner ends being substantially equal to the area of said larger portion to which they are connected and a plurality of bands surrounding said branch portions for preventing distortion under internal pressure.

7. The method of fabricating branching pipe joints of wrought material comprising forming a main cylindrical portion, forming tubular branch portions whose combined transverse area is substantially equal to the transverse area of the larger main portion, flattening one side of each of the inner ends of said branch portions, uniting said inner ends at their flattened surfaces, and then connecting the outer edges of said flattened ends with the edge of said main portion.

8. The method of fabricating branching pipe joints of wrought sheet material, comprising forming a main tubular portion, forming branch portions whose combined transverse area is substantially equal to the transverse area of the larger main portion, flattening one side of each of the inner ends of said branch portions on planes inclined to the axes thereof so as to form semi-circular ends, uniting and welding said flattened portions together, and then welding said semi-circular ends to said main portion.

WILLIAM A. PRATT.